Jan. 18, 1927.

A. D. WILLSON

GRADOMETER

Filed Sept. 26, 1923

1,614,814

INVENTOR.
A. D. Willson
BY
ATTORNEY

Patented Jan. 18, 1927.

1,614,814

UNITED STATES PATENT OFFICE.

ADOLPH D. WILLSON, OF MODESTO, CALIFORNIA.

GRADOMETER.

Application filed September 26, 1923. Serial No. 664,839.

This invention relates to improvements in grade indicating devices for motor vehicles and the like, and is particularly an improvement over my copending application filed April 30th, 1923, Serial No. 635,796.

The principal object of the present invention is to provide a device of the above named character, operating with a liquid, in which the tube carrying the liquid is so arranged that its grade indicating movement actually takes place in a direction substantially at right angles to the plane of the grade.

In other words, as the vehicle travels up or down a grade, the liquid in the gradometer will move to the left or right of the car.

This construction enables me to use tube means of such short depth longitudinally of the vehicle so that to install the device on the dash or instrument board of a car, as is customary, it is not necessary to cut the board to socket part of the meter therein, as was necessary with the device shown in the above named copending application.

Easily operated adjustment means are provided to insure the liquid being at the zero mark on the indicating dial when the car is level, regardless of the angle of slope of the board on which the meter is mounted.

As with the original article, there are no parts which can get out of order, and the present device is even easier to install than was the other. The liquid in my latest type also is less susceptible to movement due to the inertia movement of starting and stopping the car, and there is no noticeable "jiggling" of the liquid due to car vibrations at any speed.

A further object of the invention is to produce a simple and inexpensive device and yet one which will be exceedingly effective for the purposes for which it is designed.

These objects I accomplish by means of such structure and relative arrangement of parts as will fully appear by a perusal of the following specification and claims.

In the drawings similar characters of reference indicate corresponding parts in the several views.

Figure 1:
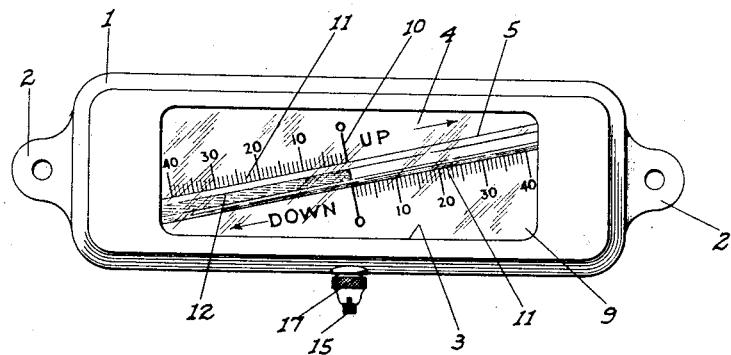
Fig. 1 is a front elevation of the device.
Figure 2:
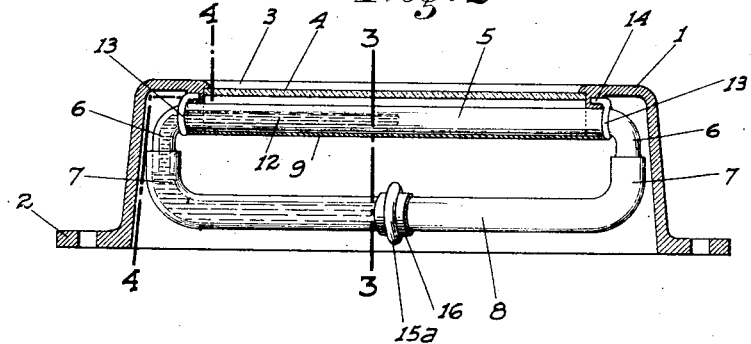
Fig. 2 is a longitudinal section of the same.
Figure 3:
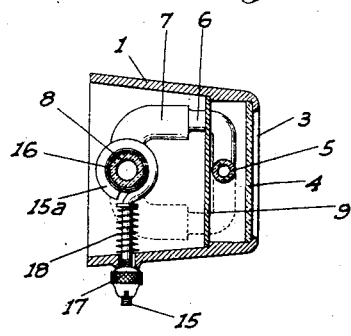
Figure 4:
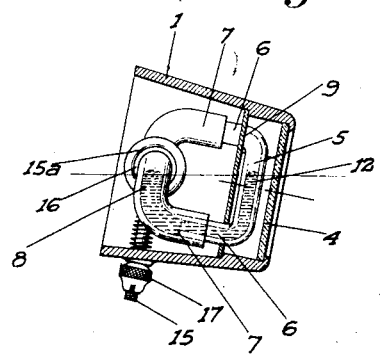

Figs. 3 and 4 are cross sections taken on the lines 3—3 and 4—4 of Fig. 2 respectively, Fig. 4 showing the device as tilted on an up-grade.

All the figures show the device approximately life-size.

Referring now more particularly to the characters of reference on the drawings, the numeral 1 denotes a casing of suitable dimensions, having drilled end-lugs or ears 2 to receive screws for securing the device to a dash-board or the like. The front vertical face of the casing has a longitudinal orifice 3 preferably covered by a transparent pane 4. Extending lengthwise of and in the casing just behind the pane 4 is a glass tube 5, having a slope from end to end of about 15° in a vertical plane transversely of the vehicle on which the meter is mounted and extending longitudinally of the casing.

The ends of this tube have horizontally disposed bends 6, extending longitudinally of the vehicle, which bends merge into or are joined with the similarly disposed bends 7 of a somewhat larger tube 8 which extends parallel to the tube 5.

Behind the tube 5 is a dial or meter-card 9 on which, on both sides of a preferably centrally disposed zero mark 10 are grade-percentage scales 11, for both up and down grades; the scale extending from said zero mark toward the lower end of the tube 5 indicating down-grades, while the scale running toward the upper end of the tubes denotes upgrades.

The size or bore of the tube 5 depends on the liquid to be used, the transverse angle of setting of the tubes relative to a horizontal plane governing the extent of actual linear movement of the liquid in the tube 5 for each percent of grade.

I preferably arrange the tubes so that I am enabled to indicate up to about 40 percent grades both up and down, without either unduly lengthening the scale and device as a whole, or having such a slight movement of the liquid that the scale is cramped and hard to read.

A liquid 12, preferably colored so as to be easily seen, fills the lower portions of both tubes to such an extent that when the casing is horizontal transversely of the car, and the tubes are in a common plane longitudinally of the car, said liquid will be at the zero mark on the scale.

It is of course an easy matter to mount the casing on a dashboard so that it will lie in a true horizontal plane transversely of the car. Dashboards on different makes of vehicles, however, have different slopes relative to a vertical plane, and therefore to make a single form of casing adaptable to any and all cars, some adjustment means must be provided to maintain the tubes in a common plane longitudinally of the car, when the latter is level, regardless of the angular setting of the casing itself.

I provide such adjustment means by the following structure: The tube 5 is pivoted at each end in the casing by any suitable means, such as for instance wire or similar loops 13 surrounding the tube and in which the latter is turnable, said loops being rigidly fixed in the casing as at 14.

The tube 8 and bends 6 and are free of the casing, and the tube 8 is therefore free to rotate about the axis of tube 5. This movement is imparted to said tube at will by means of an eye-bolt 15 extending through the casing in a vertical plane, the eye $15^a$ embracing the tube with a rubber or other sleeve 16 between the tube and eye to protect the glass from contact with the metal. A finger-nut 17 is on the outer end of the bolt, and bears against the casing, a compression spring 18 being about the bolt between its eye and the casing. It will therefore be evident that upon turning the nut 17 one way or the other the tube 8 will be raised or lowered, causing the liquid in the tube 5 to rise or fall as may be necessary to bring it to the zero mark. This adjustment is of course made after the instrument is mounted on the dash, and when once the adjustment is made, it is permanent as long as the instrument remains on the same car, or until some change is made on the car which may alter its normal horizontal alinement, such as new springs at one end or larger tires on one set of wheels.

The slope of the tubes transversely of the car is sufficient to prevent the tubes from becoming horizontal with any ordinary transverse tilting or banking of the car, since the tubes if horizontally disposed would allow the liquid to flow around in either direction temporarily destroying its grade denoting value.

As far as the normal operation of the device is concerned it is not necessary that the tubes be connected at their upper ends, which could be open to the air. This, however, would not be practical, since in shipment especially the device is apt to be upside down, and open ended tubes would allow the liquid to escape.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention what I claim as new and useful and desire to secure by Letters Patent is:

1. A gradometer comprising a pair of tubes, means connecting said tubes at their lower ends, said tubes being in spaced parallel planes, and means for supporting and mounting said tubes on a vehicle to move therewith so that the tubes will extend transversely of the vehicle at an angle to the horizon and will be spaced apart longitudinally thereof.

2. A gradometer comprising a pair of tubes adapted to be set at an angle to the horizon, means connecting said tubes at their lower ends, said tubes being in spaced parallel planes, means for supporting and mounting said tubes on a vehicle so that the tubes will extend transversely of the vehicle and will be spaced apart longitudinally thereof, and means for altering the vertical setting of the tubes relative to each other in a plane longitudinally of the vehicle independent of any movement of the latter and without disturbing the setting of the tube supporting means.

3. A gradometer comprising a pair of tubes adapted to be set at an angle to the horizon, means connecting said tubes at their lower ends, said tubes being in spaced parallel planes, a casing in which the tubes are mounted adapted to be mounted on the dashboard of a vehicle, the tubes being then parallel to said board and being spaced apart longitudinally of the vehicle, means pivotally mounting one tube in the casing, and adjustment means for rotating the other tube about said first mentioned tube as an axis, whereby to alter its vertical setting relative to the pivoted tube.

In testimony whereof I affix my signature.

ADOLPH D. WILLSON.